United States Patent
Ueda et al.

(10) Patent No.: US 6,802,922 B1
(45) Date of Patent: Oct. 12, 2004

(54) METHOD AND APPARATUS FOR MANUFACTURING PNEUMATIC TIRE

(75) Inventors: Hiroshi Ueda, Kodarra (JP); Yoshikane Osakabe, Kodarra (JP); Takeshi Sugiyama, Kodarra (JP)

(73) Assignee: Bridgestone Corporation, Tokyo (JP)

( * ) Notice: Subject to any disclaimer, the term of this patent is extended or adjusted under 35 U.S.C. 154(b) by 79 days.

(21) Appl. No.: 09/633,336

(22) Filed: Aug. 4, 2000

(30) Foreign Application Priority Data

Aug. 4, 1999 (JP) .............................. 11-221200
Jul. 4, 2000 (JP) ........................ 2000-202211

(51) Int. Cl.[7] .................. B29C 31/08; B29D 30/52; B29D 30/68; B60C 11/03
(52) U.S. Cl. ................. 156/128.6; 152/209.13; 152/209.18; 157/13; 264/326
(58) Field of Search ........................... 156/128.1, 128.6; 157/13; 152/209.1, 209.13, 209.18; 264/326; 425/450.1, 451.7

(56) References Cited

U.S. PATENT DOCUMENTS

| | | | |
|---|---|---|---|
| 2,245,728 A | * | 6/1941 | Sipe |
| 2,402,430 A | * | 6/1946 | Mooney et al. |
| 3,457,981 A | * | 7/1969 | Verdier |
| 3,502,131 A | * | 3/1970 | Rawls |
| 3,850,222 A |   | 11/1974 | Lejeune |
| 3,980,120 A | * | 9/1976 | Fawcett et al. |
| 4,080,230 A |   | 3/1978 | Batchelor et al. |
| 4,081,017 A |   | 3/1978 | Appleby et al. |
| 4,194,548 A | * | 3/1980 | Roger |
| 4,237,955 A | * | 12/1980 | Clayton |
| 4,308,083 A | * | 12/1981 | Toth |
| 4,682,641 A |   | 7/1987 | Watanabe et al. |
| 5,002,110 A | * | 3/1991 | Tsurunaga et al. |
| 5,404,925 A | * | 4/1995 | Sato et al. |
| 2002/0035908 A1 | * | 3/2002 | Kawashima et al. |

FOREIGN PATENT DOCUMENTS

| | | | |
|---|---|---|---|
| DE | 2301414 | * | 7/1974 |
| GB | 1 248 891 |   | 10/1971 |
| JP | 53-69304 | * | 6/1978 |
| JP | 53-116601 | * | 10/1978 |
| JP | 56-25004 | * | 3/1981 |
| JP | 61-3711 | * | 1/1986 |
| JP | 1-163051 | * | 6/1989 |
| JP | 4-28509 | * | 1/1992 |
| JP | 5-229312 | * | 9/1993 |

* cited by examiner

*Primary Examiner*—Steven D. Maki
(74) *Attorney, Agent, or Firm*—Sughrue Mion, PLLC (57) ABSTRACT

A method and an apparatus of simple construction for manufacturing a pneumatic tire are provided. Belt wave and unevenness of belt gauge are restrained at a minimum, joining of joint parts is ensured, installation space can be smallest within the limit of necessity and equipment cost is low. In a method for manufacturing a pneumatic tire by charging a green tire having tire components assembled in a mold for vulcanization-molding and forming lug grooves on a tire tread surface, carved grooves are previously formed at positions on a surface of the green tire corresponding to the lug grooves extending in substantially the same direction as the lug grooves.

20 Claims, 10 Drawing Sheets

METHOD AND APPARATUS FOR MANUFACTURING PNEUMATIC TIRE

BACKGROUND OF THE INVENTION

The present invention relates to a method and an apparatus for manufacturing a pneumatic tire in which a lug groove is formed on a tire tread surface.

On a tire tread surface of a pneumatic tire, there are formed a plurality of lug grooves directed about perpendicularly to circumferential direction of the tire and arranged in a row along the circumference of the tire in order to increase friction to the ground and therefore traction force. Especially, a tire for a large-sized construction vehicle has large lug grooves.

Such lug grooves on the tire tread surface are formed when a green tire is vulcanization-molded in a mold. The mold has lug groove ribs for forming the lug grooves, and the lug groove ribs cut into the tread rubber to form the lug grooves when the green tire is vulcanization-molded.

In case of a tire formed with deep lug grooves such as a tire for construction vehicle, volume of rubber removed by the lug groove rib cutting into the tread rubber is large. Therefore, a pressing force by the lug groove ribs arranged circumferentially at regular intervals acts on a belt member inside of the tread rubber largely, so that such inconveniences that a large waving of the belt member (belt wave) is caused, belt gauge (thickness of the belt member) becomes uneven or a joint portion is broken away, are apt to occur.

Especially, regarding a tire for a construction vehicle which uses a belt of low expansion rate as a tire component member, in order to prevent the lug groove rib from biting at the green tire when the mold is closed and in order to remove the lug groove rib from the produced lug groove smoothly when the mold is opened, a split mold type vulcanization-molding machine having split mold parts which are obtained by splitting the mold in a circumferential direction of the tire and movable in radial directions must be used.

However, the above-mentioned vulcanization-molding machine has a complicated construction and requires a large installation space and a high equipment cost. Especially, in case of the tire for large-sized construction vehicle, much more installation space and equipment cost are required.

SUMMARY OF THE INVENTION

The present invention has been accomplished in view of the foregoing and an object of the invention is to provide a method and an apparatus of simple construction for manufacturing a pneumatic tire in which the belt wave and unevenness of the belt gauge are restrained to a minimum, joining of the joint portion can be ensured, the installation space is smallest within the limit of necessity, and the equipment cost is low.

In order to achieve the above object, the present invention provides a method for manufacturing a pneumatic tire in which a green tire having tire components assembled is charged in a mold for vulcanization-molding and lug grooves are formed on a tire surface. The method includes previously forming curved grooves at positions on a surface of the green tire corresponding to the lug grooves extending in substantially the same direction as the lug grooves.

Since carved grooves are formed previously, before the green tire is vulcanization-molded, at portions on a surface of the green tire where lug grooves are to be formed extending in substantially the same direction as the lug grooves, volume of rubber displaced by lug groove ribs of the mold of the vulcanization-molding machine cutting into the tread surface is small and pressing force caused by the lug groove ribs is small, so that unevenness of the belt wave and the belt gauge caused by the pressing force acting on a belt member inside of the tread rubber can be restrained small, and joining of joint portions can be ensured.

In the above-mentioned pneumatic tire manufacturing method, the carved groove may be carved in a shape opened from a tread center side to a tread end. Carving work can be carried out easily.

The carved groove may be carved In a shape opened from a neighborhood of a closed end point of the lug groove to the tread end. The closed end point of the lug groove means a tip end point of the lug groove on the tread center side where the lug groove rib of the mold touches the green tire firstly when the mold is closed. Since the carved groove is carved In the above-mentioned shape, the lug groove rib enters the carved groove smoothly on molding and a predetermined lug groove can be formed accurately.

The closed end point of the lug groove may be distant from a tread center by a distance larger than 0.1 times of a tread width. Since the carved groove directed about perpendicularly to circumferential direction of the tire is carved on a surface of the green tire in a shape opened from the closed end point distant from a tread center by a distance larger than 0.1 times of a tread width to a tread center, the carving work can be carried out more easily.

A main part of the lug groove may be inclined with regard to axis of the tire at an angle of 5 degrees and more and 45 degrees and less. Since the carved groove extending in the same direction as the lug groove is also inclined with regard to axis of the tire at an angle of 5 degrees and more and 45 degrees and less, the lug groove rib of the mold enters the carved groove easily on molding and a predetermined lug groove can be formed accurately.

The carved groove may be carved in a shape opened from one tread end to another tread end. A lug groove extending continuously from one tread end to another tread end can be formed easily and a tire exhibiting excellent traction force can be manufactured.

The carved groove may be carved in a substantially triangular shape opened from a tread center side to a tread end gradually widening. The lug groove rib enters the carved groove easily when the mold is closed and a full mold composed of upper and lower split half parts can be adopted in the vulcanization-molding machine easily. Further, volume of space at a part of the carved groove not overlapping with a lug groove formed by the lug groove rib can be made so small that the space can be filled with a rubber flowing into it easily on vulcanization-molding. Thus, wrinkles caused by the space not filled with the rubber can be restrained effectively to improve appearance of the tire.

The carved groove of the gradually widening shape may be formed by carrying out the carving twice using a cutter. The gradually widening carved groove can be formed easily without necessitating a special cutter.

The carved groove may be carved along direction of the lug groove and along direction of axis of the tire from or toward a neighborhood of the closed end point of the lug groove. The carved groove can be carved along direction of the lug groove from a neighborhood of the closed end point or toward the neighborhood of the closed end point, so that an optimum carving direction can be selected in accordance with condition of the equipment.

Volume of the carved groove may be 0.4–1.2 times of volume of the lug groove. If volume of the carved groove exceeds 0.4 times of volume of the lug groove, it is possible to lessen influence of the vulcanization-molding on the belt layer to restrain the belt wave small and ensure joining of the joint portion. If volume of the carved groove is less than 1.2 times of volume of the lug groove, it is possible to restrain generation of bear and avoid poor vulcanization.

Volume of the carved groove may be 0.7–1.0 times of volume of the lug groove. Generation of the belt wave and the bear can be prevented about surely.

Depth of the carved groove may be 0.5–0.9 times of depth of the lug groove. If depth of the carved groove is less than 0.5 times of depth of the lug groove, volume of rubber displaced by the lug groove rib of the mold on vulcanization-molding is too much, and if depth of the carved groove is larger than 0.9 times of depth of the lug groove, gap between the carved groove and the lug groove rib becomes large, to cause such inconveniences that the bear is liable to be generated to bring about poor vulcanization.

The tire components may include a belt member having a relatively low expansion rate. A tire having a belt member of relatively low expansion rate such as a belt member having an embedded cord directed substantially in the circumferential direction, can be manufactured using a full-mold vulcanization-molding machine applied with the present method.

Expansion rate of the belt member may be 3% and less. The present manufacturing method can be applied to a tire with a belt member having an expansion rate of 3% and less.

A full-mold vulcanization-molding machine having an upper mold and a lower mold may be used as a mold for vulcanizing and molding the green tire. Since the carved grooves extending about in direction of the lug groove are carved on surface of the green tire previously, a full-mold vulcanization-molding machine having upper and lower half split molds can be used. The vulcanization-molding machine is simple in construction, its installation space is small and its equipment cost is low. Especially, in case of a tire for a large-sized construction vehicle, the installation space and the equipment cost can be reduced much more.

The lug groove ribs on the upper and lower molds may be fitted in the carved groove of the green tire when the green tire is charged in the full-mold vulcanization-molding machine. Since the lug groove ribs of the upper and lower molds are fitted in the carved groove of the green tire, the lug groove rib cuts into the tread rubber easily and volume of displaced rubber becomes small. Therefore, pressing force by the lug groove rib is small, the belt wave and unevenness of the belt gauge caused by the pressing force acting on the belt member inside of the tread rubber can be restrained small as possible, joining of the joint portion is ensured, and generation of wrinkles can be prevented.

According to another aspect of the invention, there is provided a method for manufacturing a pneumatic tire, comprising: a step of manufacturing a green tire in which ribbon-like or sheet-like extruded rubber is piled up on a ply and a belt member assembled on a drum to form a tread; a step of forming a carved groove on a tread surface of the green tire in direction of a lug groove; and a step of charging the green tire formed with the carved groove in a vulcanization-molding machine to carry out vulcanization-molding.

In this method, the carved groove is formed on the tread surface of the green tire in direction of a lug groove after the step of manufacturing the green tire, then the green tire is charged in the vulcanization-molding machine to carry out vulcanization-molding. Therefore, pressing force by the lug groove rib is small, the belt wave and unevenness of the belt gauge caused by the pressing force acting on the belt member inside of the tread rubber can be restrained small as possible, and joining of the joint portion is ensured.

According to a further aspect of the invention, there is provided an apparatus for manufacturing a pneumatic tire which is a full-mold vulcanization-molding machine having an upper and a lower mold each provided with lug groove ribs, and guide means provided on the molds for letting the lug groove ribs fit to carved grooves formed on a green tire when the green tire is charged in the full-mold vulcanization-molding machine.

In this apparatus, the lug groove ribs of the upper and lower molds can be fitted in the carved groove of the green tire accurately owing to the guide means, so that volume of rubber displaced by the lug groove ribs cutting into the tread rubber is small. Therefore, pressing force by the lug groove rib is small, the belt wave and unevenness of the belt gauge caused by the pressing force acting on the belt member inside of the tread rubber can be restrained small as possible, and joining of the joint portion is ensured.

DETAILED DESCRIPTION OF THE PREFERRED EMBODIMENT

Hereinafter, an embodiment of the present invention will be described with reference to FIGS. 1 to 8. The embodiment relates to manufacturing of an ORR tire (off the road radial tire) for a large-sized construction vehicle.

Figure 8:
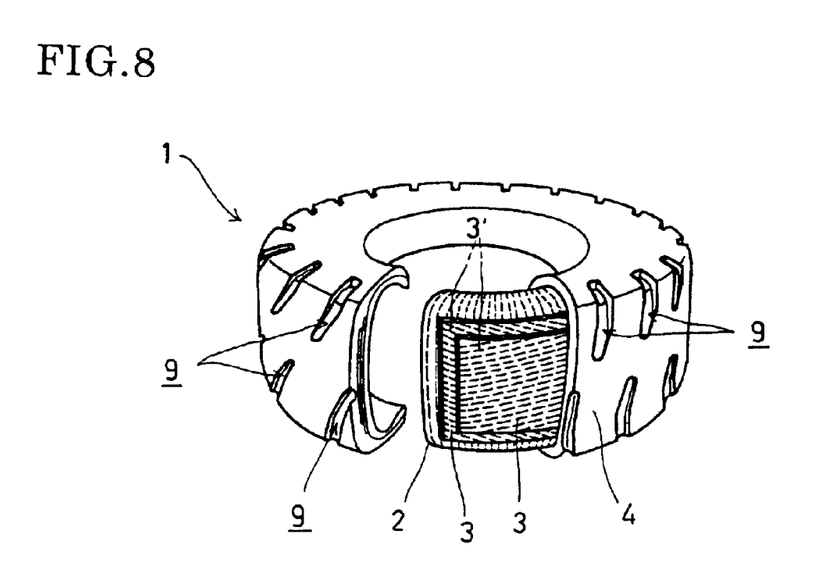
FIG. 8 is a partly broken perspective view showing a structure of the ORR tire.

As shown in FIG. 8, the ORR tire 1 comprises a carcass 2 consisting of a radial cord layer as a foundation, a belt 3 wound round the carcass 2, ans a tread 4 would round the belt 3 covering a crown section and a shoulder section.

The belt 3 is a rubber mamber having steel cords 3' embedded directed in substantially circumferential direction. Both ends of the belt 3 are joined to each other. Expansion rate (rate of change of circumferential length) of the belt on vulcanization is relatively low, 3% and less, because the steel cord 3' is directed in substantially circumferential direction.

Figure 1:
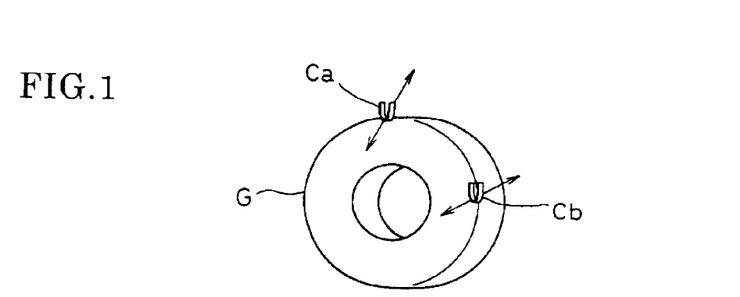
FIG. 1 is a diagram for explaining steps to form a carved groove on a green tire.

In FIG. 1, G denotes a green tire which is a state of the ORR tire 1 before vulcanization. The green tire G is supported so as to rotate and one side of a tread 4 thereof is carved using two cutters Ca, Cb.

The cutters Ca, Cb have edges charged with electric current to be superheated and carve the tread rubber melting it. Shapes of the edges of the cutters Ca, Cb are somewhat different from each other and cutting angles are also different from each other. The cutters Ca, Cb carve the same place partly overlapping each other for forming one carved groove 8.

Figure 2:
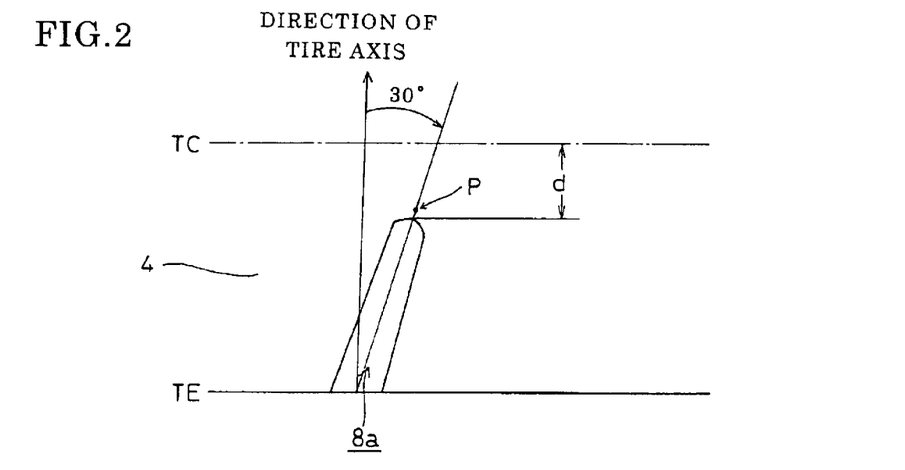
FIG. 2 is a view showing a part of a tread surface carved with one cutter.
Figure 3:
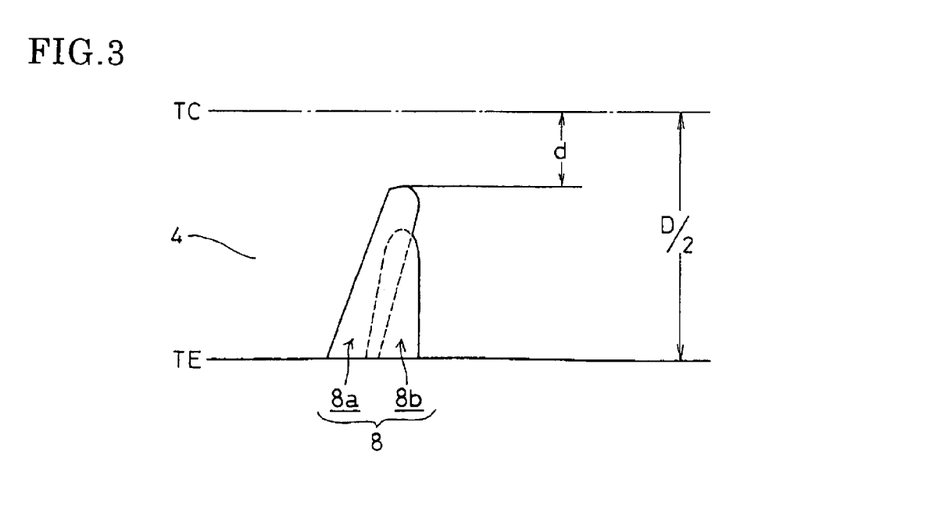
FIG. 3 is a view showing a part of a tread surface carved with two cutters.

In FIGS. 2 and 3 showing a part of surface of the tread 4, TC and TE denote a tread center and a tread end, respectively. And FIG. 2 shows a carved groove 8a formed on the surface of the tread 4 using the cutter Ca. The carved groove 8a is formed so as to elongate from a position distant from the tread center TC by a distance d (neighborhood of a closed end point P of a lug groove 9 (see FIG. 6)) to the tread end TE substantially in direction of the lug groove (direction inclined about 30 degrees to an axis of the tire).

FIG. 3 shows the carved groove 8a and a carved groove 8b formed overlapping the groove 8a. The carved groove 8b extends from a midway of the carved groove 8a to the tread end TE substantially in parallel with axis of the tire so that a triangular carved groove 8 is formed by both carved grooves 8a, 8b.

Alternatively, the carved groove 8a may be formed after the carved groove 8b is formed. The grooves 8a, 8b can be carved starting from the neighborhood of the closed end portion P of the lug groove 9 or toward the closed end point P. A most suitable covering direction can be selected in accordance with conditions of the equipment.

Anyway, the carved groove 8 is formed in a triangle gradually widening from the side of the tread center TC toward the tread end TE and opening continuously from a circumferential surface of the tread 4 to a side surface of the tread end.

Such carved grooves 8 are formed using the cutters Ca, Cb on the tread 4 of the green tire G in a circumferential direction at regular intervals. Thus, the carved groove opened gradually widening can be formed without using a special cutter. After the carved grooves 8 have been formed on one side of the tread 4, similar carved grooves 8 are formed on another side of the tread 4.

Figure 4:
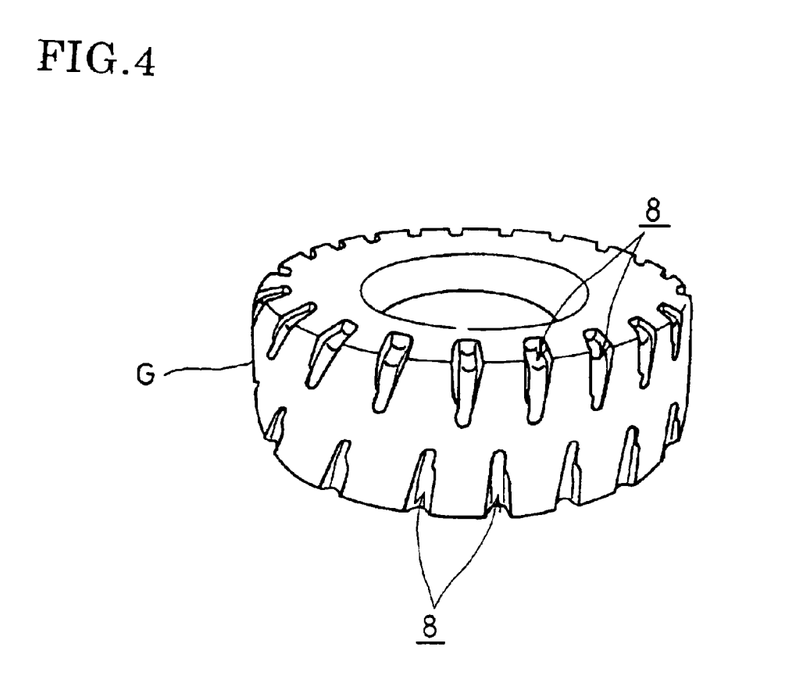
FIG. 4 is a partly broken perspective view showing a green tire formed with carved grooves.

FIG. 4 shows a green tire G formed with the carved grooves 8 in the above-mentioned manner. Referring to FIG. 3, the carved grooves 8 are formed from a position apart from the tread center TC by a distance d to the tread end TE, and the distance d is set at a value larger than 0.1 times of the tread width D.

Figure 5A:
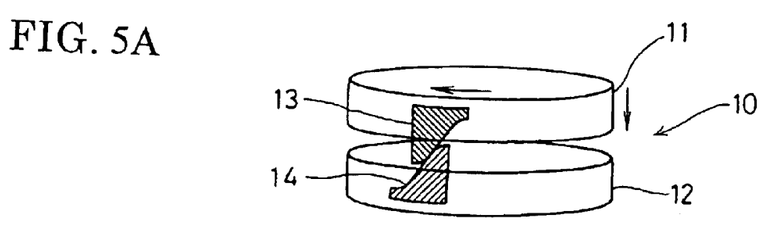
FIGS. 5(A) to (C) are schematic views showing a vulcanization-molding machine.
Figure 5B:
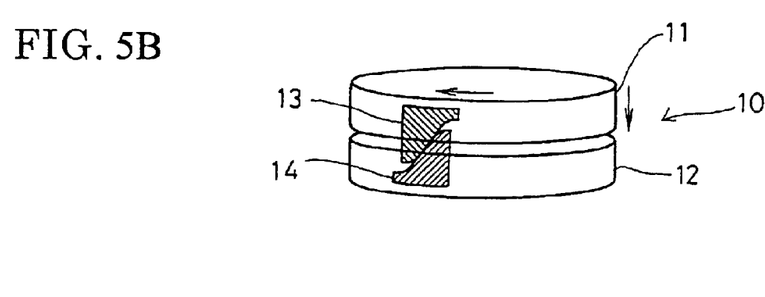
Figure 5C:
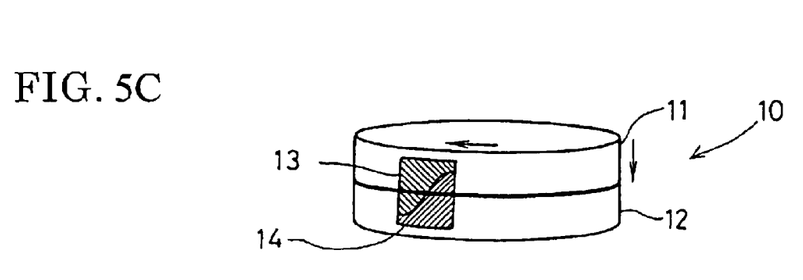

The green tire G is charged in a full-mold vulcanization-molding machine 10 for vulcanization-molding. The full-mold vulcanization-molding machine 1 has a half-sprit mold consisting of an upper mold 11 and a lower mold 12 as shown in FIG. 5 schematically.

On inner surfaces of the upper and lower molds 11, 12 are arranged respective lug groove ribs annularly. The lower mold 12 is fixed with the mold face turned upward, and above the lower mold 12 is supported the upper mold 11 movably upward and downward with the mold face turned downward. The upper mold 11 is supported so as to freely rotate about a vertical axis.

The upper and lower molds 11, 12 have respective slide guides 13, 14 projecting opposite to each other. The slide guides 13, 14 have respective slide faces coming into sliding contact with each other. The slide face is formed by a curved or straight surface inclined substantially in parallel with the lug groove.

The upper mold 11 and the lower mold 12 are joined with each other putting the green tire G between them for vulcanization-molding. At that time, a shown in FIG. 5(A), the upper mold 11 comes down to the fixed lower mold 12 until the slide face of the slide guide 13 of the upper mold 11 touches the slide face of the slide guide 14 of the lower mold 12.

When the upper mold descends further, the slide face of the slide guide 13 of the upper mold 11 slides along the slide face of the slide guide 14 of the lower mold 12. At the same time, the upper mold 11 is given a rotary force and descends rotating guided by the slide guides 13, 14 by an angle corresponding to the angle of the groove (see FIG. 5(B)), and finally the upper mold 11 is joined with the lower mold 12 as shown in FIG. 5(C).

Thus, the upper mold 11 approaches the lower mold 12 rotating and the molds 11, 12 are joined together surely at a predetermined relative position. Since the upper and lower molds 11, 12 are in a predetermined positional relation that angles of the carved groove and the lug groove rib are coincide with each other when the molds 11, 12 are joined together, if the green tire G is charged in a predetermined relation to the molds 11, 12, the lug groove ribs of the upper and lower molds 11, 12 coincide with the carved groove 8 formed on the green tire G surely.

Moreover, since the carved groove 8 formed on the green tire G is shaped in a triangle widened gradually from the tread center TC side to the tread end TE and opening of the carved groove 8 continues from the circumferential surface of the tread 4 to the tread end side surface, the lug groove ribs of the upper and lower molds 11, 12 can be fitted to the carved grooves 8 of the green tire surely and enter the grooves 8 easily by rotating the upper mold 11, when the green tire is charged in a predetermined positional relation to the upper and lower molds 11, 12 and the upper mold 11 descends to close. In addition, the closed upper and lower molds 11, 12 can be opened smoothly without interference with the tread rubber.

Figure 6:
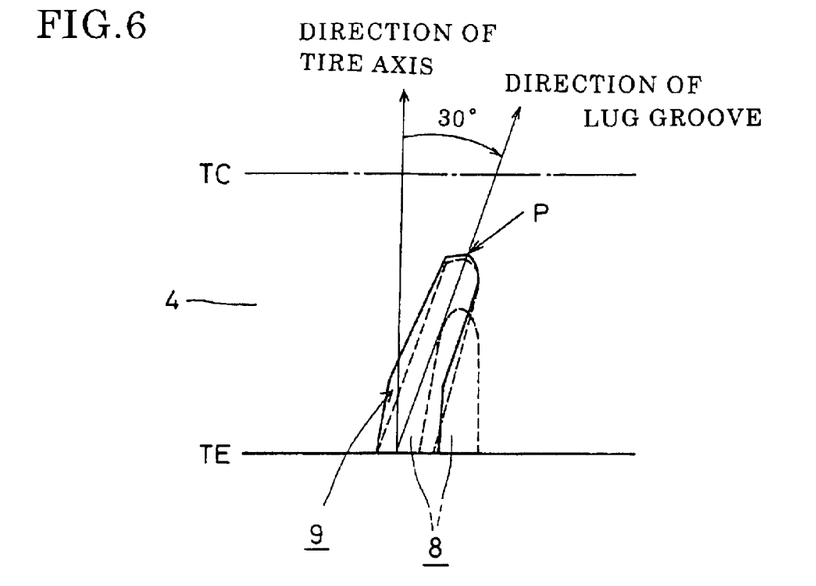
FIG. 6 is a view showing a part of a tread surface formed with a lug groove.

FIG. 6 shows a positional relation between the carved groove 8 and the lug groove 9 formed by the lug groove rib. The carved groove 8 is shown by the broken line and the lug groove is shown by the solid line. The lug groove 9 overlaps the triangular carved groove 8.

The carved groove 8 is carved starting from the neighborhood of the closed end point P which is a tip end near the tread center TC of the lug groove 9 to be formed by vulcanization molding. The lug groove rib of the mold touches the green tire firstly at the closed end point P of the lug groove 9 when the mold is closed, and the carved groove 8 is carved in a shape opened from the neighborhood of the closed end point P of the lug groove 9 to the tread end TE, therefore the lug groove ribs enter the carved grooves 8 smoothly when the mold is closed and specific lug grooves can be formed accurately.

The carved groove 8 is formed on a surface of the green tire extending about perpendicularly to the circumferential direction from the neighborhood of the closed end point P distant from the tread center TC by a distance larger than 0.1 times of the tread width to the tread end TE. Therefore, the carving work can be carried out easily.

The direction of the main part of the lug groove 9 is inclined about 30 degrees to the direction of the tire axis, and the direction of the longer carved groove 8a coincides with the direction of the lug groove.

If the inclination angle of the lug groove to the tire axis is 5 degrees and more, and 45 degrees and less, when the upper mold is joined with the lower mold while rotating on vulcanization-molding, the lug groove ribs of the upper and lower molds easily enters the carved grooves of the green tire G while turning, and a specific lug groove 9 can be formed accurately.

The volume of the carved groove 8 is selected so as to be within the limits of 0.4–1.2 times of the volume of the lug groove 9 to be formed by vulcanization-molding. If the volume of the carved groove 8 is smaller than 0.4 times of the volume of the lug groove 9, amount of rubber displaced by the lug groove rib of the mold on vulcanization-molding is too much so that pressing force by the lug groove rib is large and the belt wave by the pressing force acting on the belt 3 inside of the tread 4 is generated greatly.

Figure 7:
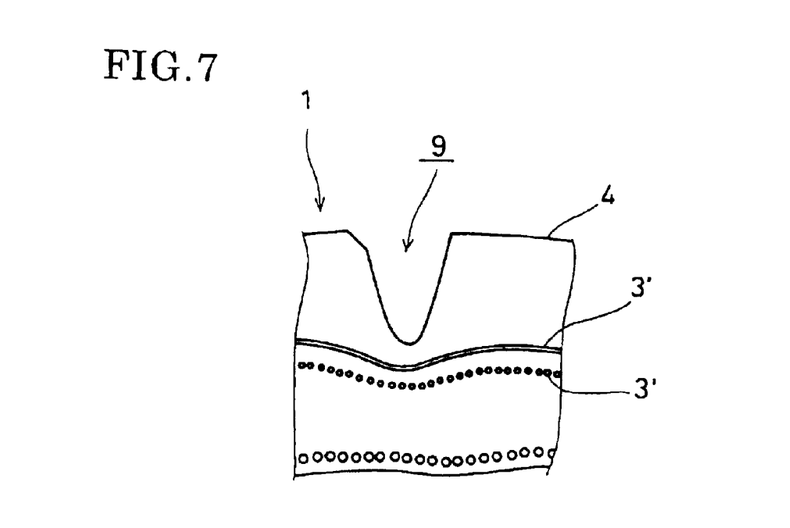
FIG. 7 is a sectional view showing inner structure of a portion near a lug groove of an ORR tire.

Therefore, by selecting the volume of the carved groove 8 so as to be 0.4 times and more of the volume of the lug groove 9, the belt wave can be restrained small as far as possible as shown in FIG. 7. Further, also unevenness of the belt gauge can be restrained small as far as possible and joining of the joint portion of the belt 3 is also ensured. As mentioned above, by forming the carved groove 8 starting from the neighborhood of the closed end point P of the lug groove 9, the belt wave can be made small further.

On the one hand, if the volume of the carved groove 8 is larger than 1.2 times of the volume of the lug groove 9, a gap between the carved groove and he lug groove rib is so large that the bear is apt to be generated to cause poor vulcanization.

Particularly, if the volume of the carved groove is 0.7–1.0 times of the volume of the lug groove, the amount of rubber displaced by the lug groove rib of the mold on vulcanization-molding is little, the lug groove rib cuts into the tread rubber easily and pressing force by the lug groove rib is small, so that the belt wave and unevenness of the belt gauge by the pressing force acting on the belt member inside of the tread rubber can be restrained to a minimum, joining of the joint portion can be ensured much more and poor vulcanization caused by generation of the bear can be prevented surely.

Since the lug groove rib enters the carved groove 8 fitting it, volume of a part of the carved groove 8 not agreeing with the lug groove 9 is small and the same part is easily filled with rubber flowing into it to prevent generation of wrinkles and maintain a good appearance.

Depth of the carved groove 8 is set to be 0.5–0.9 times of depth of the lug groove. If depth of the carved groove 8 is smaller than 0.5 times of depth of the lug groove, amount of rubber displaced by the lug groove rib on vulcanization-molding is too much. If depth of the carved groove 8 is larger than 0.9 times of depth of the lug groove, a gap between the carved groove and the lug groove rib is so large that the bear is apt to be generated and poor vulcanization is caused similarly to the above case regarding volume. These problems can be solved by selecting depth of the carved groove to 0.5–0.9 times of depth of the lug groove.

Thus, a large-sized ORR tire 1 for a construction vehicle shown in FIG. 8 is manufactured. On this tire 1, a plurality of lug grooves 9 each extending from a position of the tread near the tread center TC to the tread end TE are formed at regular intervals.

As mentioned above, by forming the triangular carved groove 8 on the green tire G previously, the green tire G can be vulcanization-molded using the full-mold vulcanizing-molding machine 10. Therefore, compared with a customary vulcanization-molding machine with split molds, construction of the vulcanization-molding machine itself is simple, the installation space is small and the equipment cost can be reduced greatly.

Figure 9:
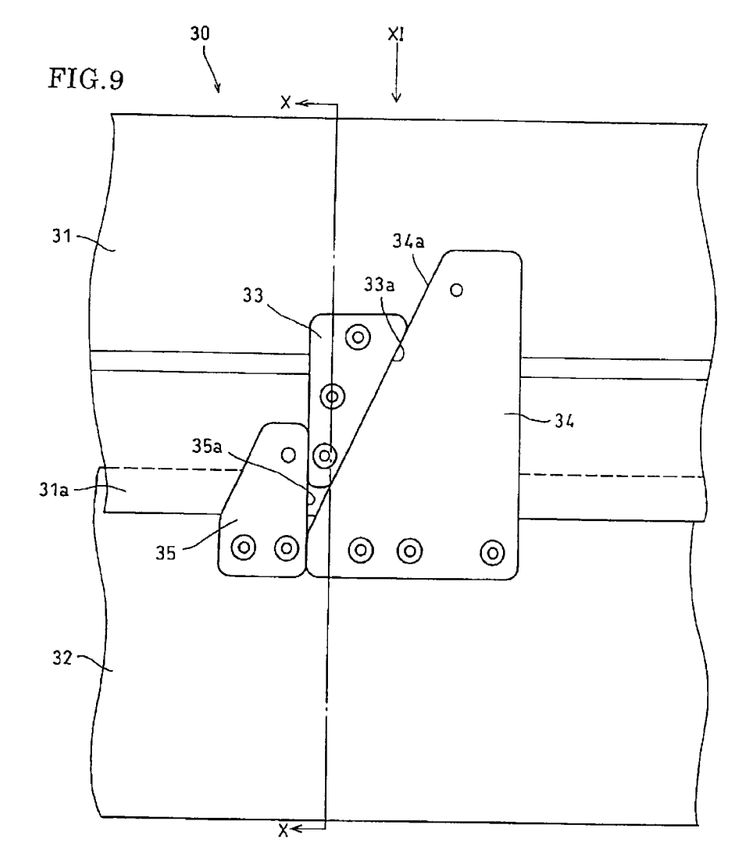
FIG. 9 is a partial side view of an upper mold and a lower mold of a vulcanization-molding machine joined together according to another embodiment.
Figure 10:
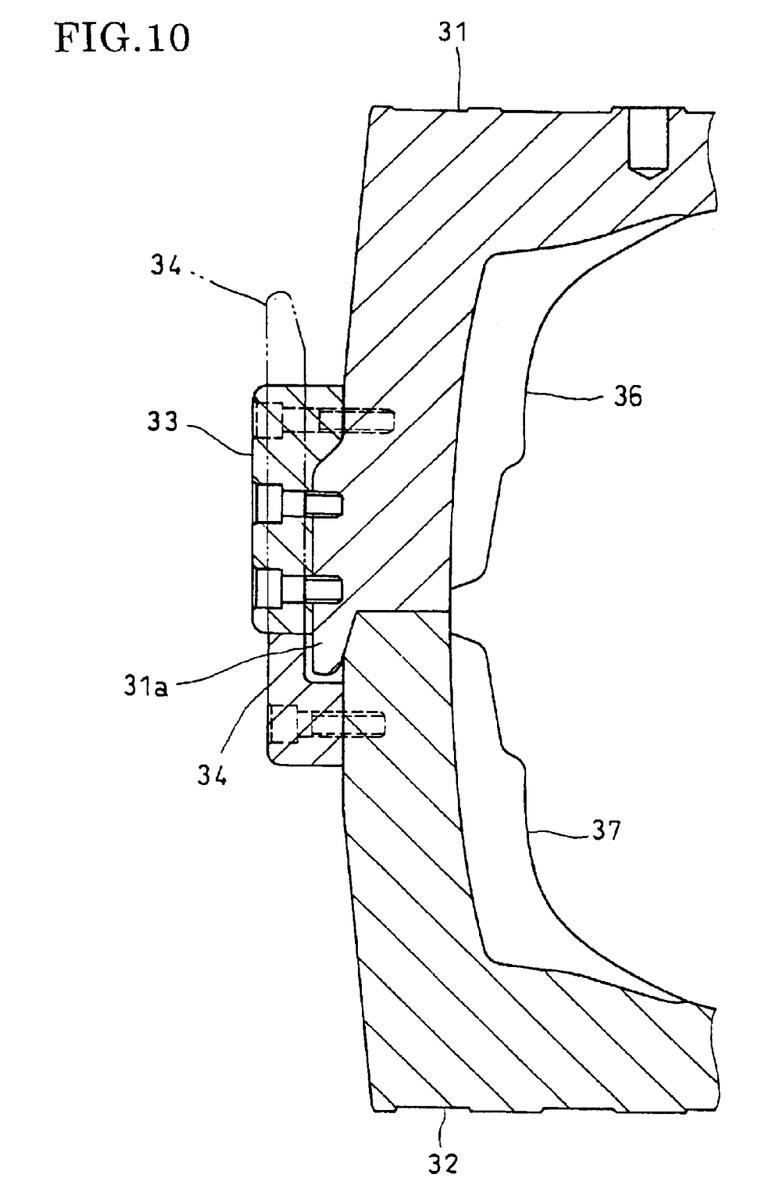
FIG. 10 is a sectional view taken along the line X—X of FIG. 9.
Figure 11:
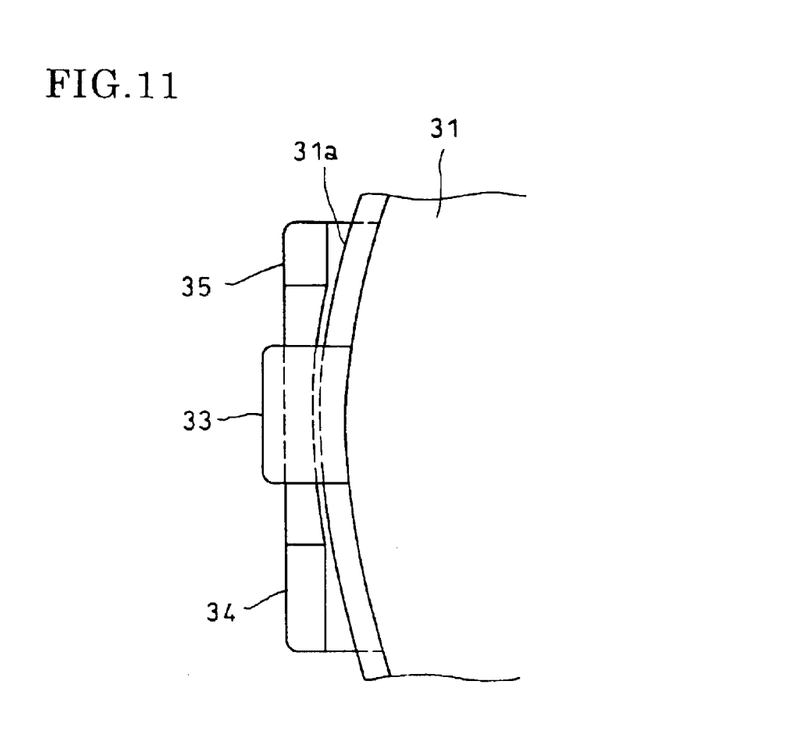
FIG. 11 is a plan view viewed in the direction of the arrow XI of FIG. 9.

In the full-mold vulcanization-molding machine 10 shown in FIGS. 5A–5C the slide guides 13, 14 of the upper and lower molds 11, 12 have somewhat curved slide face. FIGS. 9 to 11 show another example having straight guide faces.

In the full-mold vulcanization-molding machine 30 of FIGS. 9 to 11, an upper mold 31 moves up and down relatively to a lower mold 32 while rotating about a vertical axis for opening and closing. The upper mold 31 has an opening end edge projecting downward which is enlarged radially to form an engaging edge section 31a. The engaging edge section 31a engages with an opening end of the lower mold 32 projecting upward covering it from the outside so that the upper and lower molds 31, 32 are aligned and joined with each other.

On a predetermined place of an outer circumferential surface of the upper mold 31 is bolted an upper mold slide guide 33 which is shaped in a triangle with rounded corners. The upper mold slide guide 33 has a taper section of angle of about 25 degrees directed downward and an inclined side forming a slide face 33a which is inclined about 25 degrees to a vertical central axis of the mold or the tire axis.

On the other hand, on an outer circumferential surface of the lower mold 32 and at a position near the upper end thereof is fixed a lower slide guide 34 projecting upward. The lower mold slide guide 34 has a lower end portion bolted to the lower mold 32. The lower mold slide guide 34 has a shape of right-angled triangle similar to that of the upper mold slide guide 33 and is more than twice as large as the upper mold slide guide 33. The lower mold slide guide 34 has a shortest side bolted and a taper section of angle of about 25 degrees projecting upward.

The inclined side of the lower mold slide guide 34 forms a slide face 34a inclined about 25 degrees to the tire axis. The slide face 34a is opposite to the slide face 33a of the upper mold slide guide 33 for sliding contact. The above inclination angle of about 25 degrees of the slide faces 33a, 34a is equal to the angle of the lug groove ribs 36, 37 (FIG. 10) formed on inner surfaces of the upper and lower molds 31, 32.

The lower mold 32 is provided with a stopper 35 side by side with the lower mold slide guide 34. The stopper 35 is bolted at the lower end portion and projected upward similarly to the lower mold slide guide 34. The stopper is contacted with the left end of the lower side of the lower mold slide guide 34 and has a side face on the side of the lower mold slide guide 34 forming a vertical face 35a. Therefore, the inclined slide face 34a of the lower mold slide guide 34 and the vertical surface of the stopper 35 form a wedge-shaped recess opened upward.

When the upper mold 31 having the same center axis as that of the lower mold 32 descends with a predetermined relative rotational angle on vulcanization-molding, center alignment of the molds 31, 32 are carried out in such a manner that the engaging edge section 31a of the upper mold 31 covers the upper end opening edge of the lower mold 32 from the outside. At the same time, the upper mold 31 is rotated while descending as the slide faces 33a, 34a of the upper and lower mold slide guides 33, 34 slide along each other, and finally the upper mold 31 is joined with the lower mold 31.

When the upper mold 31 has been joined with the lower mold 32, the upper mold slide guide 33 is fitted into the wedge-shaped recess between the lower mold slide guide 34 and the stopper 35 to rotationally position the upper mold 31 relatively to the lower mold 32.

Since the upper mold 31 descend with rotation depending on the inclination angle of the slide faces 33a, 34a, the lug groove ribs 36, 37 directed in the same direction as the inclination angle of the slide faces 33a, 34a are fitted in the carved grooves 8 of the green tire G smoothly without being obstructed by the tread rubber, so that a specific lug groove can be formed accurately.

Figure 12:
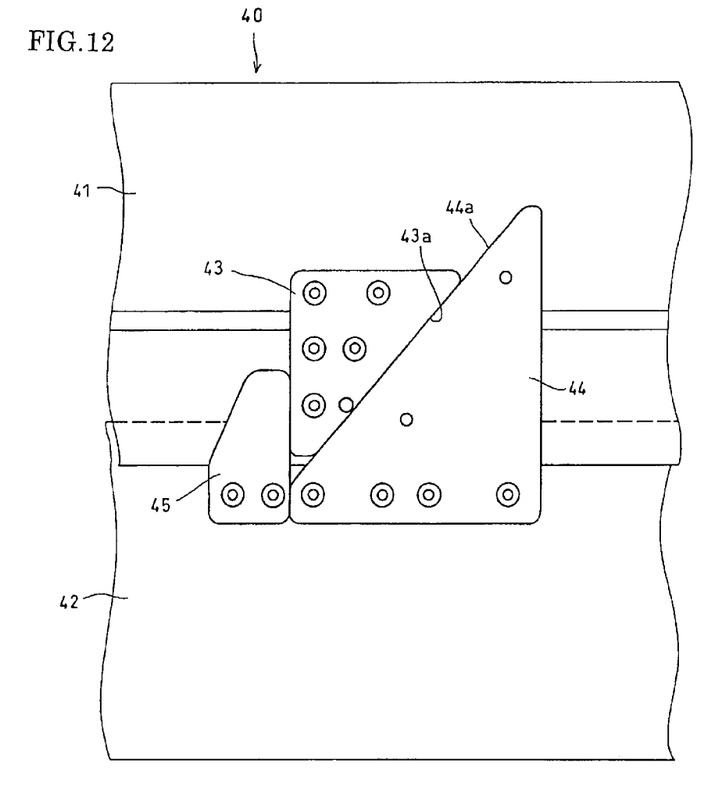
FIG. 12 is a side view similar to FIG. 9 showing a modification.

FIG. 12 shows another example in which the inclination angle of the slide surface is different from that of the above example. Namely, the slide faces 43a, 44a of the upper and lower mold slide guides 43, 44 are inclined about 40 degrees to the tire axis.

Therefore, in this example, the lug groove ribs on inner faces of the upper and lower molds are also inclined about 40 degrees to the tire axis. When the upper mold 41 descends while rotating because of slide motion of the slide guides 43, 44 and joins with the lower mold 42, in spite of the large inclination angle to the tire axis, the lug groove rib is fitted in the carved groove of the green tire smoothly and a lug groove having a inclination angle of 40 degrees to the tire axis is formed with a high accuracy.

Also in this example, a stopper 45 is attached to the lower mold 42 in contact with the lower mold slide guide 44.

What is claimed is:

1. A method for manufacturing a pneumatic tire, comprising:

manufacturing a green tire in which extruded rubber having the shape of a ribbon or a sheet is piled up on a ply and a belt member assembled on a drum to form a tread;

forming a carved groove on a tread surface of said green tire in direction of a lug groove;

charging said green tire formed with said carved groove in a vulcanization-molding machine to carry out vulcanization-molding so as to form a vulcanized tire having the lug groove, which is formed by a lug groove rib of the vulcanization-molding machine the vulcanization-molding machine having an upper mold part and a lower mold part; and inserting one of the lug groove ribs into a corresponding carved groove formed on said tread surface of the green tire while rotating one of the upper mold part and the lower mold part relative to the green tire through an angle corresponding to an angle between a longitudinal axis of the carved groove and an axis of the tire.

2. A method as claimed in claim 1, wherein the step of rotating said upper mold part relative to said lower mold part is carried out with a slide guide fixed to the upper mold part being guided by slide glide fixed to the lower mold part, wherein each of the slide guides includes a slide face which is inclined relative to the axis of the tire at an angle corresponding to the angle between the longitudinal axis to the carved groove and the axis of the tire.

3. A method for manufacturing a pneumatic tire in which a green tire having tire components assembled is charged in a mold for vulcanization-molding and lug groove are formed on a tire tread surface within the mold by lug groove ribs provided on an inner surface of the mold, the mold having an upper mold part and a lower mold part, said method comprising:

previously forming carved grooves at positions on a tread surface of said green tire corresponding to said lug grooves such that the carved grooves extend in substantially the same direction as said lug grooves and such that each of the carved grooves has substantially a triangular shape that widens gradually from a side of a tread center to a side of a tread end; and inserting one of the lug groove ribs into a corresponding carved groove formed on said tread surface of the green tire while rotating one of the upper mold part and the lower mold part relative to the green tire through an angle corresponding to an angle between a longitudinal axis of the carved groove and an axis of the tire.

4. A method for manufacturing a pneumatic tire as claimed in claim 1, wherein said groove is carved in a shape opened from a tread center side to a tread end.

5. A method for manufacturing a pneumatic tire as claimed in claim 4, wherein said craved groove is carved in a shape opened form a neighborhood of a closed end point of said lug groove to said tread end.

6. A method for manufacturing a pneumatic tire as claimed in claim 5, wherein said closed end point of said lug groove is distant from a tread center by a distance larger than 0.1 times of a tread width.

7. A method of manufacturing a pneumatic tire as claimed in claim 1, wherein a main part of said lug groove is inclined with regard to the axis of the tire at the angle of 5 degree and more and 45 degree and less.

8. A method of manufacturing a pneumatic tire as claimed in claim 1, wherein said carved groove is carved in a shape opened from one tread end to another tread end.

9. A method for manufacturing a pneumatic tire as claimed in claim 1, wherein said carved groove having the shape gradually widening is formed by carrying out the carving twice using a cutter.

10. A method for manufacturing a pneumatic tire as claimed in claim 8, wherein said carved groove is carved along a direction of said lug groove and along a direction of the axis of the tire from or toward a neighborhood of said close end point of said lug groove.

11. A method of manufacturing a pneumatic tire as claimed in claim 1, wherein a volume of said carved groove is 0.4–1.2 times a volume of said lug groove.

12. A method of manufacturing a pneumatic tire as claimed in claim 11, wherein the volume of said carved groove is 0.7–1.0 times the volume of said lug groove.

13. A method of manufacturing a pneumatic tire as claimed in claim 11, wherein a depth of said carved groove is 0.5–0.9 times a depth of said groove.

14. A method of manufacturing a pneumatic tire as claimed in claim 1, wherein said tire components include a belt member having a relatively low expansion rate.

15. A method for manufacturing a pneumatic tire as claimed in claim 14, wherein an expansion rate of said belt member is 3% or less.

16. A method for manufacturing a pneumatic a tire as claimed in claim 1, wherein a full-mold vulcanization-molding machine having the upper mold part and the lower mold part is used as the mold for vulcanizing and molding said green tire.

17. A method for manufacturing a pneumatic tire as claimed in claim 16, wherein lug groove ribs on said upper and said lower mold parts are fitted in said carved groove of said green tire when said green tire is charged in said full-mold vulcanization-molding machine.

18. A method as claimed in claim 1, wherein said triangular shape is formed by carving a first groove extending a direction inclined to said axis of the tire and a second groove extending substantially in parallel with said axis and partly overlapping said first groove.

19. A method of manufacturing a pneumatic tire as claimed in claim 1, further comprising:
   providing said upper mold part and said lower mold part with said lug groove ribs;
   relatively moving said upper mold part to said lower mold part to close said mold; and
   rotating said upper mold part relative to said lower mold part while the upper mold part is moving toward said lower mold part.

20. A method for manufacturing a pneumatic tire as claimed in claim 19, wherein said step of rotating said upper mold part relative to said lower mold part is carried out with a slide guide fixed to the upper mold part being guided by a slide glide fixed to the lower mold part, wherein each of the slide guides includes a slide face which is inclined relative to the axis of the tire at an angle corresponding to the angle between the longitudinal axis of the carved groove and the axis of the tire.

* * * * *